United States Patent [19]

Denhartog et al.

[11] Patent Number: 5,747,091
[45] Date of Patent: May 5, 1998

[54] SWEETENED EXTRUDED FOOD PRODUCTS

[75] Inventors: Lisa Denhartog, Toronto, Canada; Christopher Robin Heath, Surrey, England; Sandra Mills Ketelsen, Fanwood, N.J.; Valerie Melega, Toronto, Canada; Gary Allen Miller, New Hope, Pa.; Joseph Michael Zannoni, Lawrenceville, N.J.

[73] Assignee: Tate & Lyle Public Limited Company, London, England

[21] Appl. No.: 714,826

[22] Filed: Sep. 17, 1996

Related U.S. Application Data

[63] Continuation of Ser. No. 307,829, filed as PCT/GB93/00657, Mar. 30, 1993, published as WO93/19623, Oct. 14, 1993, abandoned.

[30] Foreign Application Priority Data

Mar. 30, 1992 [GB] United Kingdom ............ 9206920

[51] Int. Cl.⁶ .................................................. A23L 1/236
[52] U.S. Cl. ............ 426/548; 426/549; 426/618; 426/619; 426/620; 426/621; 426/658; 426/448; 426/449; 426/450; 426/516
[58] Field of Search ................ 426/549, 448, 426/618, 658, 632, 634, 548, 619, 620, 621, 443, 445, 446, 447, 449, 450, 516

[56] References Cited

U.S. PATENT DOCUMENTS

| | | | |
|---|---|---|---|
| 4,343,934 | 8/1982 | Jenner et al. | 426/658 |
| 4,418,088 | 11/1983 | Carterot | 426/549 |
| 4,435,640 | 3/1984 | Hough et al. | 426/658 |
| 5,143,240 | 9/1992 | Blanchard et al. | 426/448 |

FOREIGN PATENT DOCUMENTS 9107103  5/1991  WIPO.

OTHER PUBLICATIONS

Food Science & Technology Abstacts, 1993: Interntional Food Information Service; AN 93-05-t0021; C.R. Health: "Sucralose: Properties and Application"; see abstract & Symposium: New Technologies for the Food and Drink Industries (Campden).

Patent Abstracts of Japan, vol. 13, No. 510 (C-654) 15 Nov. 1989 & JP,A, 12 06 969 (Takeda Chem. Ind.) 12 Aug. 1989.

Patent Abstracts of Japan, vol. 13, No. 221 (C-598) 23 May 1989 & JP,A,10 34 261 (Takeda Chem. Ind.) 3 Feb. 1989.

J. L. Multon: "Additifs & Auxiliaries de Fabrication dans les Industries Agro–Alimentaires" 1992, TEC & DOC—Lavosier, Paris: see pp. 331–332, paragraph 4.1.6.

R. B. Fast: "Breakfast Cereals and How They Are Made", 1990, American Association of Cerial Chemistrs, St. Paul, Minnesota, USA, see pp. 12–13, paragraph Noncaloric Sweeteners.

*Primary Examiner*—Leslie Wong
*Attorney, Agent, or Firm*—Ostrolenk, Faber, Gerb & Soffen, LLP

[57] ABSTRACT

A sweetened extruded food product based on a vegetable material containing a sweetener incorporated before extrusion is formulated so that the sweetener contains a significant proportion of sucralose. In particular, the sucralose provides at least 50%, preferably at least about 75%, of the sweetness.

13 Claims, No Drawings

1

SWEETENED EXTRUDED FOOD PRODUCTS

This is a Continuation of application Ser. No. 08/307,829 filed on Nov. 28, 1994, now abandoned, which is a National Stage Filing of PCT/GB93/00657, filed on Mar. 30, 1993.

BACKGROUND OF THE INVENTION

1. Field of the Invention

This invention relates to the production of sweetened extruded food products such as breakfast cereals and snack foods containing the high intensity sweetener sucralose (1,6-dichloro-1,6-dideoxy-β-D-fructofuranosyl 4-chloro-4-deoxy-(α-D-galactopyranoside). The use of sucralose as a high intensity sweetener in sweetening compositions, ingestible products and oral compositions is disclosed in British Patent No. 1,544,167.

2. Description of the Related Art

By an "extruded food product" we mean a cooked, extruded food product based on edible vegetable materials comprising or derived from cereals, legumes, tubers, nuts, and the like, and mixtures thereof. The term includes human foods and animal feeds and further includes both finished food products and also food ingredients such as textured vegetable protein products. By a "breakfast cereal" there is meant an extruded food product based on cereals such as corn, wheat and oats, and mixtures thereof, usually eaten with milk, for example corn flakes. By a "snack food" there is meant a ready to eat extruded food product based on edible vegetable materials as mentioned above, such as a flavored cereal snack or potato sticks.

Conventional sweetened extruded food products such as breakfast cereals and snack foods often have a high sugar content, comprising a wide variety of monosaccharides and disaccharides including sucrose, high fructose corn syrups (HFCS), dextrose, fructose, maltose, lactose and mixtures thereof. The sugar is important as a source of sweetness, bulk and texture as well as enhancing the flavor of such foods and providing an easily digestible source of energy. The sugar may be incorporated in the extruded product and/or may be coated thereon.

There is considerable interest in foodstuffs with a reduced sugar content amongst consumers who wish to reduce their intake of sugars and to consume a higher proportion of carbohydrates in the form of starch and dietary fiber. Other consumers, such as diabetics, require sugar-free foods.

One way in which manufacturers have responded to the desire for foods with a reduced sugar content has been to replace some or all of the sugar with a high intensity sweetener. Generally this has proved difficult for products such as breakfast cereals and snack foods which traditionally depend upon sugars to provide properties such as bulk, texture, viscosity and flavor enhancement, as well as sweetness.

Hitherto, high intensity sweeteners have not been incorporated during the manufacture of sweetened extruded food products, in part because of their instability to high temperatures during cooking (particularly aspartame) or their poor quality of sweetness compared to sugars (for example, saccharin), and in part because they do not provide the desired bulk, texture and flavor which sugars impart to the products.

Sucralose differs from other available high intensity sweeteners in having both a clean, sweet taste and a high degree of stability when used in the production of high temperature processed products (M R Jenner, Lindsey Bagley and C R Heath, in Food Technology International 1989, Sterling Publications Ltd). Further, sucralose is remarkably stable when incorporated in processed foods.

Conventional sweetened extruded food products are produced using cooking extruders such as the Wenger TX-series (Wenger Manufacturing, Inc., Sabetha, Kans., USA) and the Baker-Perkins MPF50 (APV Baker, Peterborough, England). In this process, a mixture of ingredients comprising the edible vegetable material, often in the form of a flour, water and sugar, is cooked in the extruder at a temperature of about 35°–120° C. and is then extruded as pellets or other shaped pieces, allowed to cool and settle for a few minutes and dried to the desired moisture content at temperatures ranging from about 100°–180° C.

When high levels of sugar are used, e.g. around 12% to 15%, the sugar can interfere with gelatinization of the flour and this causes the extruded pellets to clump and stick together. This problem may be exacerbated by the inclusion of other ingredients such as malt syrup which is commonly used as a flavoring. Thus, in order to provide the desired level of sweetness it is often necessary to include less sugar and to coat the product with additional sugar.

Higher levels of sugar can be incorporated in bran-based products, up to about 18%, to improve palatability, but the products are rather heavy textured.

SUMMARY OF THE INVENTION

We have now found that highly acceptable breakfast cereals and snack foods can be produced by using sucralose to provide some or all of the sweetness formerly provided by sucrose and other sugars. The sweetness of sucralose in these products varies from about 180 to 400 times that of sucrose depending upon the concentration at which it is used and the nature of the other ingredients, and the quality of the sweetness imparted by sucralose is similar to that of sucrose. Further, sucralose can be incorporated at levels which provide sufficient sweetness without the need for a sugar coating. Still further, the use of sucralose in extruded food products has unexpected advantages with respect to processing and to the physical properties of the products.

We have found that the extrusion process can be operated to produce products with a reduced sugar content by replacing some or all of the sugar with an appropriate amount of sucralose. Unexpectedly, we have found that this does not require special reformulation of the product to replace the bulk and texture formerly provided by the sugar, and highly acceptable products are obtained by simply increasing the content of the cereal or other vegetable material. It seems possible that the special organoleptic properties of sucralose which confer a quality of sweetness similar to that of sucrose, may also influence the sensory perception of texture or "mouthfeel" so that the product is as palatable as one made with sugar.

Unlike sugar, sucralose does not interfere with gelatinization and it is possible to incorporate sucralose in the products at levels which provide sufficient sweetness without the need for a coating of sugar or other sweetener.

Further, reduction of the sugar content to less than about 12% avoids the problem of undue stickiness and clumping of the extruded product.

Another unexpected advantage of using sucralose to sweeten extruded food products is that the products often retain their crispness longer than those sweetened with sugar. This is particularly advantageous in the case of sucralose sweetened breakfast cereals such as corn flakes which retain their crispness longer when immersed in milk than do the conventional sugar sweetened products, particularly those with a relatively high sugar content.

A further unexpected advantage of using sucralose to sweeten extruded food products is that sucralose sweetened products often exhibit a greater volume expansion during extrusion and have a lower bulk density than sucrose sweetened products. This is particularly noticeable for products based on dense materials with a high fiber content, such as bran, although other products such as potato sticks can benefit from the enhanced expansion. Thus sucralose sweetened bran rods had a much lighter texture than the sucrose sweetened counterparts and were much more palatable. Thus, for example, products may be obtained having a bulk density of from 75% down to about 45% of that obtained using an all-sugar sweetener.

The advantages of using sucralose to sweeten extruded food products are greatest when it is used to replace a relatively high proportion of the conventional sugar sweetener. Satisfactory products can be made by replacing at least about half of the sugar with sucralose but in general we prefer to replace at least 75% of the sugar with sucralose: that is to say, the sweetness contribution of the sucralose should preferably be at least 50%, especially at least 75% of the total sweetness.

DETAILED DESCRIPTION OF THE PREFERRED EMBODIMENTS

Thus, according to the present invention, we provide a sweetened extruded food product based on a vegetable material containing sweetener incorporated before extrusion, characterized in that the sweetener comprises a significant proportion of sucralose. According to a further feature of the present invention we provide a process for manufacturing sweetened extruded food products by cooking a mixture of vegetable material (for example material comprising or derived from cereals, legumes, tubers, nuts, and the like, or mixtures thereof), water and sucralose, extruding the cooked mixture as pellets or other shaped pieces and drying them to the desired moisture content. Other ingredients such as sugars, malt syrup, flavorings and salt can be incorporated during the cooking step and the product may be flaked and/or toasted to provide a crisp product with a distinctive flavor.

The sucralose may be mixed with the other ingredients prior to processing in the extruder or may be diluted with water to the desired concentration and fed into the extruder through a separate inlet to that used for the other ingredients.

The process can be used to make a wide range of sweetened extruded food products including breakfast cereals and snack foods. Thus, according to a further embodiment of the present invention, we provide sweetened extruded food products containing sucralose. These products have a reduced sugar content compared to conventional products of the same type and can be made to contain no added sugar. The sucralose content may vary from about 0.01% to 0.2% by weight, depending upon the desired level of sweetness and the amount of sugar replaced. Thus, the concentration of sucralose required to produce a sweetness equivalent to 6% sucrose is about 0.02% to 0.03% and the concentration required to provide a sweetness equivalent to 18% sucrose is about 0.08% to 0.10%. Higher concentrations of sucralose up to about 0.2% are required to provide the levels of sweetness equivalent to those of some products with an additional sugar coating, e.g., "frosted" corn flakes. Sucralose concentrations for partial replacement of sugar over the full range of products will vary from 0.01% to 0.10% for 50% replacement and from 0.015% to 0.150% for 75% replacement.

The invention is illustrated by the following Examples.

EXAMPLE 1

Flaked Breakfast Cereal

Three types of product were made, using maize flour; one comprising flour and water, without any sweetener (A); one comprising flour, sugar and water, the sugar being pre-blended with the flour (B); and one comprising flour, water and sucralose, the sucralose being added as an aqueous solution (C).

Maize flour (A and C), or maize flour plus sugar at 12% on a dry weight basis (B), in each case containing 12.9% moisture, was fed into the barrel of a Baker-Perkins MPF50, 25 twin screw extruder fitted with two 4 mm diameter dies and heated to a constant temperature of 120° C., at 41 Kg/h, and moved along by the screws at a constant speed of 220 rev/min. As the mixture of ingredients passed along the barrel, additional water was added (at 8.2 l/h for A and B; and 5.8 l/h for C) to produce a slurry containing 27% moisture, and the partially cooked product was extruded as pellets after a retention time of about 45 seconds.

For C, an aqueous solution of sucralose (0.5% w/v) was added through a separate inlet, at 2.5 l/h, to provide the required sweetness, equivalent to 12% sugar. The moisture content prior to extrusion was 27.42% for A and B, and 27.55% for C. The sucralose content of C was 0.035% dry weight basis.

The extruded pellets were collected and fed through an 8 inch flaking roll to produce flakes. The flakes were toasted in an oven at 170° C. for 12 minutes. After cooling to ambient temperature, the finished product was packed in cartons.

Samples of products A (flour and water) and C (flour, water and sucralose) were ground to a fine powder with a pestle and mortar. Powdered material of product A was spiked with sucralose by mixing with an aqueous solution of sucralose to give a concentration of 0.032% sucralose on a dry weight basis and freeze drying to remove the water. Sucralose was extracted from samples of the powdered material by adding boiling water and shaking for 10 minutes. The aqueous extract was then concentrated and analysed by HPLC.

Analysis of spiked samples of product A indicated that the recovery of sucralose was 93.7% on average (seven replicates; coefficient of variation ±4.8%). Applying this mean recovery factor to the results of the analysis of product C, it was estimated that the sucralose content varied from 0.034% to 0.038%, with a mean value of 0.0365% (four replicates; coefficient of variation ±4.7%). The difference between this value and the original sucralose content of 0.035%, is statistically insignificant (p=0.05).

Both products B and C were found to have a similarly pleasant sweetness and texture.

EXAMPLE 2

Sucralose Sweetened Corn Flakes

| Ingredients (% by weight): | |
|---|---|
| Fine corn meal* | 97.76 |
| Salt | 1.47 |
| Sucralose LC25** | 0.22 |

| Ingredients (% by weight): | |
|---|---|
| N&A Grain Flavour LDF 264388+ | 0.50 |
| N&A Grain Flavour LDF 264389+ | 0.25 |

*Dry-milled maize, particle size 0.3–0.17 mm
**Sucralose liquid concentrate (25% w/w);
+Haarmann & Reimer Preparation:
1. Mix together all ingredients except sucralose.
2. Mix sucralose with water to desired concentration.
3. Feed mixture of ingredients and sucralose into extruder (Wenger TX80) through separate inlets and extrude at 96° C. and 3.45 MPa (500 psi) as beads.
4. Pass beads through flaking roll.
5. Dry for 5 minutes at 182° C. to moisture content of about 3%.

EXAMPLE 3

Corn Flakes Sweetened with Sucralose and/or Sucrose

| Ingredients (% by weight): | | | |
|---|---|---|---|
| Fine corn meal | 97.56 | 91.67 | 85.78 |
| Salt | 1.47 | 1.47 | 1.47 |
| Sucralose LC25 | 0.22 | 0.11 | — |
| Sucrose | — | 6.00 | 12.00 |
| N&A Grain Flavour LDF 264388+ | 0.05 | 0.50 | 0.50 |
| N&A Grain Flavour LDF 264389+ | 0.25 | 0.25 | 0.25 |

+Haarmann & Reimer

Preparation:
1. Mix together all ingredients except sucralose.
2. Mix sucralose with water to desired concentration.
3. Feed mixture of ingredients and sucralose into extruder (Wenger TX80) through separate inlets and extrude at 96° C. and 3.45 MPa (500 psi) as beads.
4. Pass beads through flaking roll.
5. Dry for 5 minutes at 182° C. to moisture content of about 3%.

The cornflakes sweetened with sucralose and with sucralose plus sucrose were rated as sweeter than those sweetened with sucrose, but the flavor and overall liking of the products were rated the same for all three products. The sucralose sweetened cornflakes were crisper than those sweetened with sucrose.

EXAMPLE 4

Multi-Grain Flakes with Banana Flavour

| Ingredients (% by weight): | |
|---|---|
| Whole cut wheat | 40.00 |
| Brown rice flour | 31.58 |
| Fine corn meal | 20.00 |
| Corn bran | 6.50 |
| Salt | 1.50 |
| Sucralose LC25 | 0.22 |
| Banana flavor #75420-33 (Givaudan (Canada) Inc.) | 0.20 |

Preparation:
1. Mix together all ingredients except sucralose.
2. Mix sucralose with water to desired concentration.
3. Feed mixture of ingredients and sucralose into extruder (Wenger TX80) through separate inlets and extrude at 96° C. and 3.45 MPa (500 psi).
4. Pass extruded beads through flaking roll.
5. Dry for 5 minutes at 182° C. to moisture content of less than 3%.

EXAMPLE 5

"Fruity Loop" Extruded Breakfast Cereal

| Ingredients (% by weight): | | | |
|---|---|---|---|
| Corn flour | 43.190 | 43.230 | 43.230 |
| Wheat flour | 31.420 | 31.450 | 31.450 |
| Oat groat flour | 22.340 | 22.360 | 22.360 |
| Salt | 1.490 | 1.490 | 1.490 |
| Corn oil | 0.498 | 0.500 | 0.500 |
| Sucralose LC25 | 0.347 | 0.347 | 0.347 |
| Citric acid | 0.500 | 0.400 | 0.400 |
| Flavor (Haarmann & Reimer) | 0.200a | 0.200b | 0.200c |
| Coloring | 0.015a | 0.023b | 0.023c | a = lemon #264292; yellow #5;
b = orange #264051; yellow #5/red #40 (2:1);
c = strawberry #US 64703; red #40.

Preparation:
1. Mix together all ingredients except sucralose.
2. Mix sucralose with water to desired concentration.
3. Feed mixture of ingredients and sucralose into extruder (Wenger TX80) through separate inlets and extrude at 93° C. and 6.9 MPa (1000 psi).
4. Form into ring shapes.
5. Dry for 10 minutes at 1160° C. to moisture content of less than 1%.
6. Mix lemon, orange and strawberry loops in equal proportions.

The quality of the fruity loop product was compared with that of a conventionally sweetened, commercially available product, "Kellogg's Froot Loops", containing sucrose incorporated in the cereal matrix (8%) and coated on the loops (about 50% by weight), by 15 taste panelists.

The panelists found that the Kellogg's Froot Loops were sweeter than the sucralose-sweetened product, due to the rather heavy coating of sucrose, but the flavor, texture and overall liking of the products were similar.

EXAMPLE 6

Cookie-Flavored Snack Food

| Ingredients (% by weight) | |
|---|---|
| Corn flour | 21.50 |
| Barley flour | 21.73 |
| Wheat flour | 31.96 |
| Oat flour | 22.48 |
| Salt | 1.50 |
| Corn oil | 0.50 |
| Bakery flavor (Givaudan 70187) | 0.11 |
| Sucralose LC25 | 0.22 |

Preparation:
1. Mix together all ingredients except sucralose.
2. Mix sucralose with water to desired concentration.
3. Feed mixture of ingredients and sucralose into extruder (Wenger TX80) fitted with disc-shaped die through separate inlets and extrude at 118° C. and 2.76 MPa (400 psi).
4. Dry for 10 minutes at 116° C. to moisture content of less than 1%.

EXAMPLE 7

Apple Cinnamon Flavored Snack

| Ingredients (% by weight): | |
|---|---|
| Corn flour | 21.45 |
| Barley flour | 21.66 |
| Wheat flour | 31.87 |
| Oat flour | 22.41 |
| Salt | 1.49 |
| Corn oil | 0.50 |
| Apple Cinnamon flavor (Haarman & Reimer) | 0.40 |
| Sucralose LC25 | 0.22 |

Preparation:
1. Mix together all ingredients except sucralose.
2. Mix sucralose with water to desired concentration.
3. Feed mixture of ingredients and sucralose into extruder (Wenger TX80) fitted with disc-shaped die through separate inlets and extrude at 118° C. and 2.76 MPa (400 psi).
4. Dry for 10 minutes at 116° C. to moisture content of less than 1%.

EXAMPLE 8

Chocolate Flavored Snack

| Ingredients (% by weight): | |
|---|---|
| Corn flour | 40.32 |
| Wheat flour | 29.82 |
| Oat flour | 20.97 |
| Salt | 1.40 |
| Corn oil | 0.47 |
| Cocoa Powder | 6.52 |
| Caramel Cream flavor | 0.28 |
| Sucralose LC25 | 0.22 |

Preparation:
1. Mix together all ingredients except sucralose.
2. Mix sucralose with water to desired concentration.
3. Feed mixture of ingredients and sucralose into extruder (Wenger TX80) fitted with disc-shaped die through separate inlets and extrude at 118° C. and 2.76 MPa (400 psi).
4. Dry for 10 minutes at 116° C. to moisture content of less than 1%.

EXAMPLE 9

Cornflakes Sweetened with Sucrose, HFCS, Dextrose or Sucralose

| Ingredients (% by weight): | A | B | C | D |
|---|---|---|---|---|
| Fine corn meal | 90.24 | 88.16 | 88.20 | 95.84 |
| Emulsifier+ | 0.24 | 0.24 | 0.24 | 0.24 |
| Salt | 0.97 | 0.97 | 0.97 | 0.96 |
| Water | 2.71 | 2.54 | 2.65 | 2.88 |
| Sucrose | 5.84 | — | — | — |
| HFCS (42% fructose) | — | 7.99 | — | — |
| Dextrose | — | — | 7.94 | — |
| Sucralose LC25 | — | — | — | 0.08 |

+concentrated glyceryl monostearates (Eastman Chemical Products, Inc., Kingsport, Tennessee)

Preparation:
1. Mix together all ingredients except sucralose.
2. Mix sucralose with water to desired concentration.
3. Feed mixture of ingredients and sucralose into extruder (Wenger TX80) fitted with disc-shaped die through separate inlets and extrude at 118° C. and 2.76 MPa (400 psi).
4. Dry for 10 minutes at 116° C. to moisture content of about 3%.

Product D (sucralose) was rated as sweeter than products A (sucrose), B (HFCS) and C (dextrose) but all four products were rated similarly for overall flavor and texture.

EXAMPLE 10

Potato Sticks Sweetened with Sucralose

| Ingredients (% by weight) | A | B |
|---|---|---|
| Potato flour | 57.13 | 46.94 |
| Fine corn meal | 38.08 | 31.30 |
| Sucralose LC25 | 0.21 | — |
| Sucrose | — | 17.18 |
| Water | 4.58 | 4.58 |

Preparation:
1.1 Product A: Mix together sucralose, corn meal and water, then add potato flour.
1.2 Product B: Mix together corn meal and water, then add potato flour and sucrose.
2. Feed mixture of ingredients into extruder (Wenger TX52) and extrude at 102° C. (sucralose) or 114° C. (sucrose) and 10.34 MPa (1500 psi) (sucralose) or 7.6 MPa (1100 psi) (sucrose), passing through belt cutter to divide into sticks.
3. Dry for 10 minutes at 116° C. to moisture content of about 3%.

The sucralose sweetened potato sticks (A) were much lighter textured, with a density of 0.098 g/ml, than the sucrose sweetened product (B) which had a density of 0.206 g/ml.

EXAMPLE 11

Soy Snack Sweetened with Sucralose or Unsweetened

| Ingredients (% by weight) | A | B |
|---|---|---|
| Defatted soy flour | 49.89 | 50.00 |
| Corn flour | 49.89 | 50.00 |
| Sucralose LC25 | 0.22 | — |

1. Mix together ingredients.
2. Feed mixture of ingredients into extruder (Wenger TX52) and extrude at 116° C. and 4.14 MPa (600 psi), passing through belt cutter to divide into sticks.
3. Dry for 10 minutes at 116° C. to moisture content of about 4%.

EXAMPLE 12

Bran Buds Breakfast Cereal Sweetened with Sucrose or Sucralose

| Ingredients (% by weight) | A | B | C |
|---|---|---|---|
| Heavy Bran | 64.79 | 79.08 | 78.88 |
| Soft wheat flour | 16.20 | 19.70 | 19.72 |
| Salt | 1.00 | 1.00 | 1.00 |
| Sucrose | 18.01 | — | — |
| Sucralose LC25 | — | 0.22 | 0.40 |

Preparation:
1. Mix together ingredients.

2. Feed mixture of ingredients into extruder (Wenger TX80) and extrude at 93° C. and 3.45 MPa (500 psi) as beads.
3. Dry for 5 minutes at 154° C. to moisture content of about 0.5%.

The sucralose sweetened bran buds (B and C) showed a greater expansion of volume than the sucrose sweetened product (A) and had a lighter texture. The densities of the products (g/ml) were: A, 0.145; B, 0.112; C, 0.105.

EXAMPLE 13

Texturized Vegetable Protein Sweetened with Sucralose

| Ingredients (% by weight) | |
|---|---|
| Defatted soy flour | 99.55 |
| Sucralose LC25 | 0.45 |

Preparation:
1. Mix together ingredients.
2. Feed mixture of ingredients into extruder (Wenger TX20) and extrude at 68° C. and 3.45 MPa (500 psi), as pellets.
3. Dry for 5 minutes at 104° C. to moisture content of about 3%.

EXAMPLE 14

Moist Petfood Sweetened with Sucrose (A) or Sucralose (B)

| Ingredients (% by weight) | A | B |
|---|---|---|
| Yellow corn | 50.10 | 53.28 |
| Wheat grains | 3.72 | 4.00 |
| Rice grains | 3.72 | 4.00 |
| Vitamin mix | 0.10 | 0.10 |
| Brewers yeast | 0.25 | 0.25 |
| Corn gluten meal | 7.50 | 7.98 |
| Soybean meal | 5.60 | 6.00 |
| Poultry meal | 16.90 | 17.98 |
| Salt and trace minerals | 1.00 | 1.00 |
| Colouring Red #40 | 0.03 | 0.03 |
| Potassium sorbate | 0.30 | 0.30 |
| Phosphoric acid | 1.00 | 1.00 |
| Glycerine | 3.76 | 4.00 |
| Sucrose | 6.02 | — |
| Sucralose LC25 | — | 0.08 |

Preparation:
1. Mix together ingredients.
2. Feed mixture of ingredients into extruder (Wenger TX20) and extrude at 37° C. and 2.76 MPa (400 psi), as pellets.
3. Dry to moisture content of about 30%.

We claim:

1. A sweetened cooked extruded food product having a bulk density and a total sweetness, the food product comprising:

a starch-containing vegetable material; and a sweetener, substantially all of the sweetener being incorporated before extrusion, the sweetener comprising sucralose in an amount which provides at least 50% of the total sweetness, wherein the total sweetness is equivalent to that provided by at least 12% sucrose, and the bulk density of the food product is less than that of the food product having the total sweetness provided by sucrose.

2. A food product according to claim 1, in which the sucralose provides at least 75% of the sweetness.

3. A food product according to claim 1, in which the sucralose content is from 0.01% to 0.2% by weight.

4. A food product according to claim 2, having a bulk density of from 45 to 75% that of an equivalent product using an all-sugar sweetener.

5. A process for manufacturing a sweetened cooked extruded food product having a bulk density and a total sweetness, the process comprising the steps of:

cooking a mixture of starch-containing vegetable material, water and sweetener in a cooking extruder;

extruding the cooked mixture as pellets or other shaped pieces, substantially all of the sweetener having been added prior to extrusion; and drying the pieces, as necessary, to obtain a desired moisture content, wherein the sweetener comprises sucralose in an amount which provides at least 50% of the total sweetness, the total sweetness is equivalent to that provided by at least 12% sucrose, and the bulk density of the food product is less than that of a food product having the total sweetness provided by sucrose.

6. A process according to claim 5, in which the sucralose provides at least 75% of the sweetness provided by the sweetener.

7. A process according to claim 5, in which the sucralose content in the product is from 0.01% to 0.2% by weight.

8. A process according to claim 5, in which the sucralose content in the product is from 0.015% to 0.15% by weight.

9. A food product according to claim 1, in which the sucralose content is 0.015% to 0.15% by weight.

10. A food product according to claim 1 in which the vegetable material is a cereal.

11. A food product according to claim 4 in which the vegetable material is a cereal.

12. A process according to claim 5 in which the vegetable material is cereal.

13. A process according to claim 8 in which the sucralose provides at least 75% of the sweetness provided by the sweetener.

* * * * *